United States Patent [19]

Konishi et al.

[11] Patent Number: 5,117,419
[45] Date of Patent: May 26, 1992

[54] SYSTEM FOR CONTROLLING DATA TRANSMISSION AND RECEPTION IN A NETWORK

[75] Inventors: Kuniyoshi Konishi, Hachiooji; Akihiko Tojima, Tachikawa, all of Japan

[73] Assignee: Kabushiki Kaisha Toshiba, Kawasaki, Japan

[21] Appl. No.: 774,000

[22] Filed: Oct. 9, 1991

Related U.S. Application Data

[63] Continuation of Ser. No. 373,057, Jun. 29, 1989, abandoned.

Foreign Application Priority Data

Jun. 30, 1988 [JP] Japan .............................. 63-160817

[51] Int. Cl.⁵ ............................................. H04J 4/00
[52] U.S. Cl. .................................. 370/50; 370/85.12; 370/85.13; 359/118

[58] Field of Search .................. 370/50, 85.9, 85.11, 370/85.12, 85.13, 85.14, 85.15, 65.5, 124; 359/118, 119, 124, 135; 340/825.05

[56] References Cited

U.S. PATENT DOCUMENTS

| | | | |
|---|---|---|---|
| 4,612,635 | 9/1986 | Leete | 370/85.12 |
| 4,692,918 | 9/1987 | Elliott et al. | 370/85.13 |

*Primary Examiner*—Benedict V. Safourek
*Assistant Examiner*—Melvin Marcelo
*Attorney, Agent, or Firm*—Finnegan, Henderson, Farabow, Garrett and Dunner

[57] ABSTRACT

An optical network system having a ring-type network, a bus-type network, and a plurality of stations connecting the ring-type network to the bus-type network. Each station has a plurality of internal buses, and a plurality of transmission-reception processing stations each corresponding to the internal buses. The transmission-reception processing sections independently perform the transmission of data between the ring-type network and the bus-type network.

16 Claims, 2 Drawing Sheets

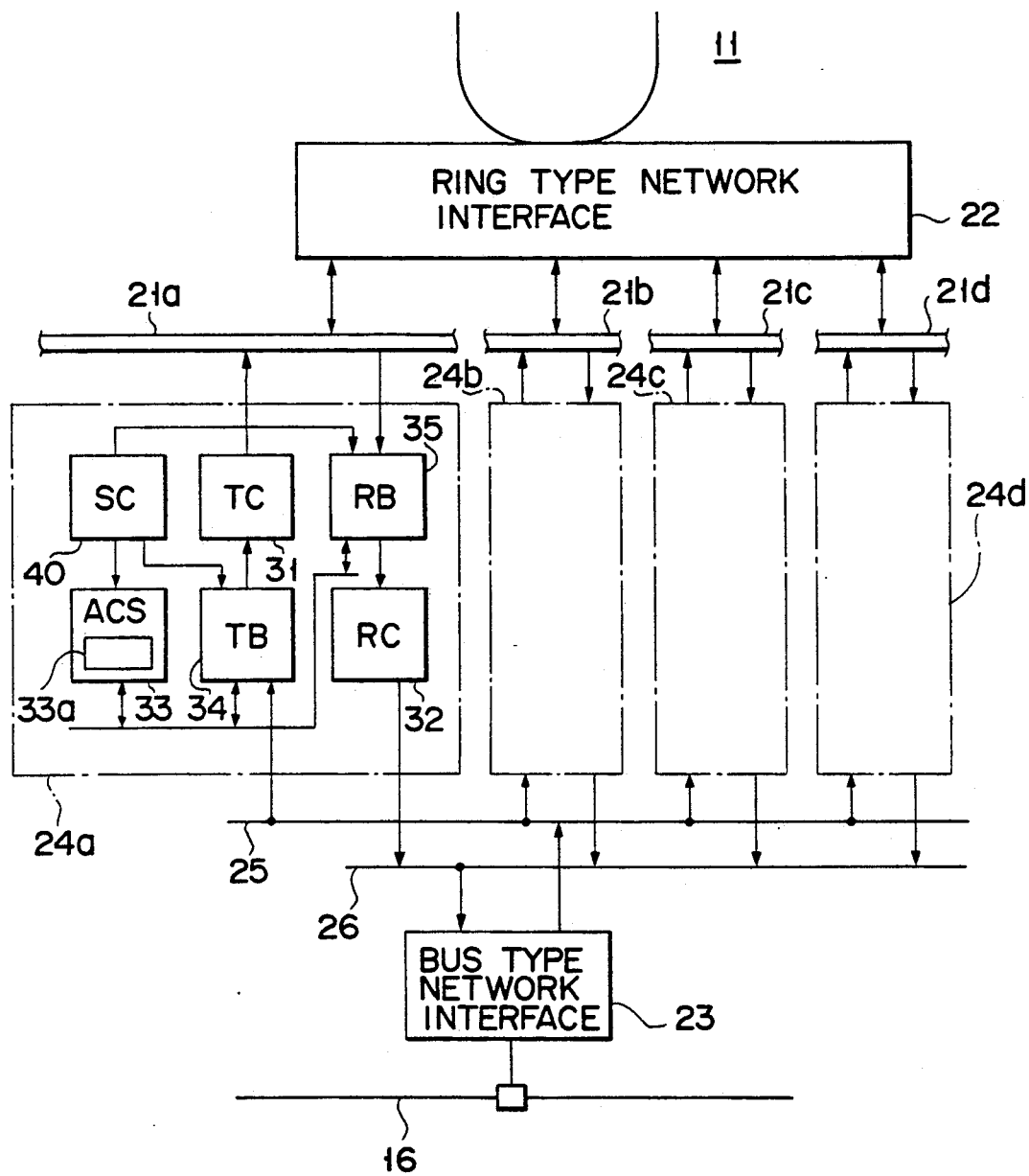
F I G. 2

SYSTEM FOR CONTROLLING DATA TRANSMISSION AND RECEPTION IN A NETWORK

This application is a continuation of application Ser. No. 07/373,057, filed Jun 29, 1989, now abandoned.

BACKGROUND OF THE INVENTION

1. Field of the Invention

The present invention relates to a system for controlling data transmission and reception in a network.

2. Description of the Related Art

Generally, a communication network comprises a ring-type network, a bus-type network, and a number of stations. Each station has a ring-type network interface, a bus-type network interface, and a transmission-reception processing section connected between a ring-type network interface and a bus-type network interface. The data transferred from the bus-type network via the bus-type network interface is stored into the transmission buffer incorporated in the transmission-reception processing section. The source-address data (i.e., the data representing the address of the data source connected to the bus-type network) and the address data of the station are stored, as a set of data, into an address-changing table incorporated in the station.

The transmission-reception processing section searches the address changing table for destination-address data. When the destination-address data is not found in the table or is broadcast-address data, it is determined to be special station-address data. In this case, the transmission-reception processing section transmits data to all other stations at the same time. When the destination-address data is found in the address-changing table, the section transmits the data to only the station represented by the station-address data corresponding to the destination-address data. Until the section finishes transmitting this data, it cannot transmit any other data.

When data is supplied from the ring-type network to the transmission-reception processing section through the ring-type network interface, this data is stored into the reception buffer incorporated in the section. Destination-address data and station-address data included in this data are stored into the address-changing table. The transmission-reception processing section transmits the data stored in the reception buffer to the bus-type network through the bus-type network interface. Until the section finishes transmitting the data to the bus-type network, it can receive no data.

As has been pointed out, until the transmission-reception processing section completes the transmission of data from the ring-type network or the bus-type network which is connected to the ring-type network by the station, it cannot transmit any other data. The throughput in the communication network is reduced.

Accordingly, it is desirable that the throughput of the data transmission and reception between a ring-type network and a bus-type network is increased.

SUMMARY OF THE INVENTION

The object of the present invention is to provide a system for controlling data transmission and reception in a network.

According to the aspect of the present invention, there is provided a network system comprising:

a trunk network having a plurality of logical passes in an optical transmission line;
 a branch network;
 a station for performing data transmission between the trunk network and the branch network;
 wherein the station includes:
  a plurality of internal buses corresponding to the respective logical buses;
  first network interface means for transmitting data to the logical passes, and for transmitting data to the internal bus;
  second network interface means for performing the data transmission from/to the branch network; and
  a plurality of transmission-reception control means corresponding to the internal buses, respectively, for controlling the data transmission between the internal buses and the second network interface means.

BRIEF DESCRIPTION OF THE DRAWINGS

FIG. 2 is a block diagram illustrating one of the stations of the network system shown in FIG. 1.

DETAILED DESCRIPTION OF THE PREFERRED EMBODIMENT

Figure 1:
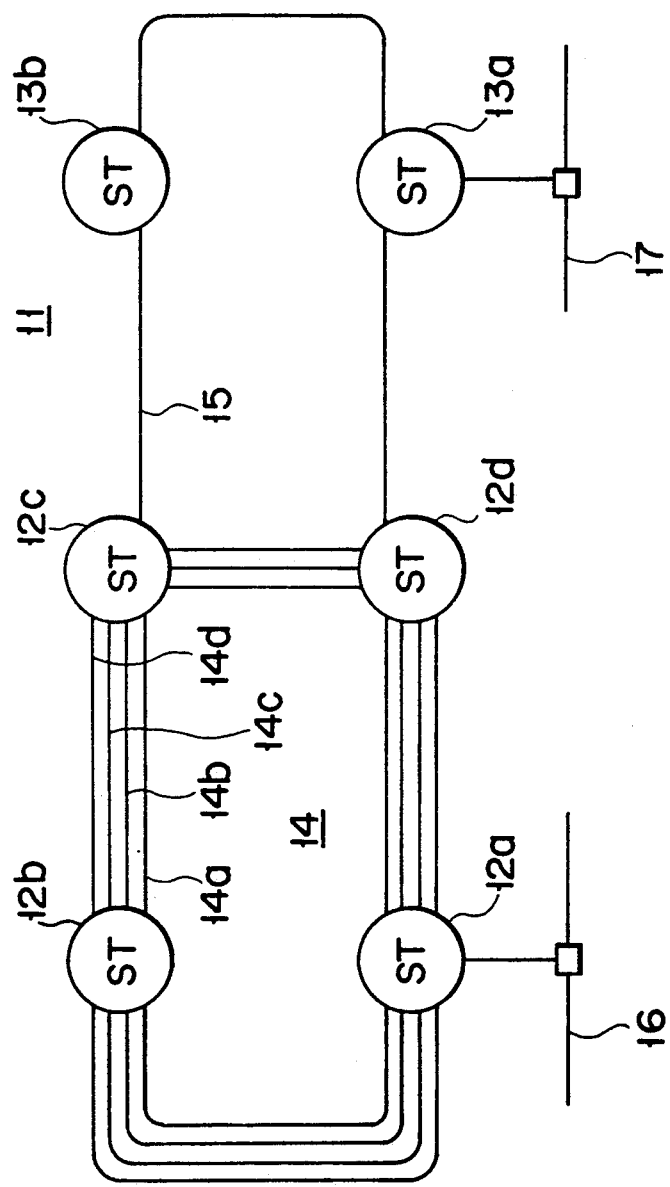
FIG. 1 is a diagram showing a network system according to one embodiment of the present invention.

An embodiment of the invention will now be described with reference to the accompanying drawings.

As is shown in FIG. 1, the network system has stations (ST) 12a to 12d, 13a, and 13b, which are connected to one another by a ring-type network 11. The stations 12a to 12d have four internal buses for transmitting data to and receiving data from the ring-type network 11. The stations 13a and 13b have only one internal bus, as the stations of the conventional network system.

The network system includes an optical cables 14 and 15 which are the transmission media forming an optical transmission path for the ring-type network 11. The optical cable 14 is used to transmit wavelength-multiplexed optical signals having different wavelengths. Logically, the cable 14 includes four logical passes 14a to 14d. The system further has two bus-type networks 16 and 17 which are used as branch networks. The bus-type networks 16 and 17 are connected to the ring-type network 11 which is used as a trunk network, by the stations 12a and 13a, respectively.

FIG. 2 shows a detailed construction of the station 12a. Internal buses 21a to 21d of the station 12a are connected to the logical passes 14a to 14d, respectively. A ring-type network interface 22 connects the internal buses 21a to 21d to the logical passes 14a to 14d. Data on the internal buses 21a to 21d are transmitted to the logical passes 14a to 14d via the ring-type network interface 22, and data transmitted from the ring-type network 11 are transferred to the internal buses 21a to 21d via the ring-type network interface 22. A bus-type network interface 23 connects the station 12a to the bus-type network 16.

The station 12a has four transmission-reception processing sections 24a to 24d, a data-transmission line 25, and a data-reception line 26. The transmission-reception processing sections 24a to 24d are coupled to the internal buses 21a to 21d, respectively, for transmitting data from the internal buses 21a to 21d to the bus-type network interface 23, and for receiving data from the bus-type network interface 23 to be transmitted to the buses 21a to 21d. More precisely, the data is transferred from the bus-type network 16 to the sections 24a to 24d through the bus-type network interface 23 and then through the data-transmission line 25. The data supplied from the internal buses 21a to 21d to the sections 24a to 24d is transferred to the bus-type network 16 through the bus-type network interface 23.

Each of the transmission-reception processing sections 24a to 24d has the same structure. In FIG. 2, only the section 24a is illustrated in detail. As shown in FIG. 2, the section 24a comprises a transmission controller (TC) 31, a reception controller (RC) 32, an address-changing section (ACS) 33, a transmission buffer (TB) 34, a reception buffer (RB) 35, and a system controller (SC) 40. The transmission controller 31 controls the receiving of data from the bus-type network 16, and the transmission of data to the internal bus 21a. The reception controller 32 controls the receiving of data from the internal bus 21a and the transmission of data to the network 16. The transmission buffer 34 stores the data transmitted from the bus-type network 16, and the reception buffer 35 stores the data transmitted from the internal bus 21a. The address-changing section 33 has an address-changing table 33a for storing the address data of the station 12a and that of the bus-type network 16 connected to the station 21a, both in the form of hash data. The system controller 40 controls the address-changing section 33, the transmission buffer 34, and the reception buffer 35.

The operation of the network system will now be explained.

Assume that the bus-type network interface 23 of the station 12a receives data having a source address data and a destination information data from the bus-type network. Then, the data are transferred from the interface 23 to the transmission-reception processing section 24a through the data-transmission line 25. The data are stored into the transmission buffer 34 of the transmission-reception processing section 24a.

The source-address data (i.e., the address of the source (not shown) connected to the bus-type network 16 and the address data of the station 12a) are stored in the address-changing table 33a of the address-changing section 33. The address-changing section 33 searches the address-changing table 33a in response to destination-address data included in the data. When the destination-address is not found in the table 33a or is a broadcast-address data, the transmission controller 31 transfers the data stored in the transmission buffer 34, and to the internal bus 21a in accordance with the broadcast-address data.

The sequence of operations described above can be performed also in the other transmission-reception processing sections 24b, 24c, and 24d. In each of these transmission-reception processing sections 24b to 24d, the data from the data-transmission line 25 are transferred to the internal buses in accordance with the broadcast-address data when the destination-address data of the data is not found in the address-conversion table 33a or is the broadcast-address data.

The data transferred from the transmission-reception processing sections 24a and 24d to the internal buses 21a to 21d, respectively, are input to the ring-type network interface 22. The ring-type network interface 22 converts the data into optical signals having predetermined wavelengths corresponding to the logical passes 14a to 14d of the optical cable 14. These optical signals are transmitted to the ring-type-network 11 through the logical passes 14a to 14d.

The stations other than the source station 12a receive the data transmitted to the ring-type network 11 when the destination-address data of the data is a broadcast-address data. In this case, the station 12a does not receive the data, or disposes the data if it receives the data. The stations 13a and 13b receive only the optical signals having the predetermined wavelength corresponding to one of the logical passes 14a–14d, for example, the logical pass 14a.

On the other hand, when the destination-address data of the data transmitted from the bus-type network 16 is found in the address-changing table of the transmission-reception processing sections 24a to 24d, the data are transferred in either of the following two ways.

1) The transmission-reception processing sections 24a to 24d are selected in a predetermined order, and the selected transmission-reception processing section transmits the data. For example, when the transmission-reception processing section 24a is selected, the transmission controller 31 transmits the data through the internal bus 21a. When the destination station is busy, or there is no response from the destination station, the transmission-reception processing section 24b transmits the data to another destination station. When the section 24a is busy transmitting data to a station, the section 24b, independent of other section 24b, can transmit the data to another station.

2) When the selecting of the transmission-reception processing sections 24a to 24d is not prearranged in a predetermined order; any one of the transmission-reception processing sections 24a to 24d, which is not currently transmitting data, is selected to transmit the data.

Since the transmission-reception processing sections 24a to 24d can operate independently of one another, to transmit the data to the ring-type network 11, the network system of the present invention provides a greater throughput than the conventional network system. In the conventional network system, the transmission-reception processing section cannot transmit the next data before the first data is completely transmitted.

Similarly, the data can be transmitted to the stations 13a and 13b by selecting the transmission-reception processing sections 24a to 24d in a predetermined order. As described in conjunction with the embodiment of the present invention above, the sections 24a may transmit the data from the station 13a to the bus-type network 17. In either one of the two ways of transmitting the data described above, the selection of the transmission-reception processing section can be made in accordance with a predetermined command.

Next, the operation of the network system when the station 12a receives the data from the ring-type network 11 will be explained.

When the ring-type network interface 22 of the station 12a receives the broadcast-address data from the logical passes 14a to 14d of the ring-type network 11, the broadcast-address data is output to the internal buses 21a to 21d corresponding to the logical passes 14a to 14d. The data output to the internal buses 21a to 21d is transferred to the transmission-reception processing sections 24a to 24d.

The reception buffer 35 of the transmission-reception processing section 24a stores the data. The address-changing section 33 obtains the address data of the section 12a and of the source station from the data stored in the reception buffer 35, and stores the address data in the address-changing table 33a of the transmission-reception processing section 24a. Similarly, the address data is also stored in transmission-reception processing sections 24d, 24c, and 24d. After the address data has been stored in the address-changing tables 33 of the transmission-reception processing sections 24a to 24d, the reception controller in each of these sections 24a to 24d (e.g., the reception controller 32 of the section 24a) transmits the data stored in the reception buffer 35 to the bus-type network 16 via the data-reception line 26 and the bus-type network interface 23.

When the ring-type network interface 22 of the station 12a receives the data from the logical pass 14a of the ring-type network 11, this data is transferred to the internal bus 21a only. Therefore, the address data of the data thus transferred is stored in the address-changing table 33a in only the transmission-reception processing section 24a, and the reception controller 32 of the transmission-reception processing section 24a transmits the data to the bus-type network 16. The transmission-reception processing sections 24a to 24d can receive data simultaneously.

The present invention is not limited to the embodiment described above. Various changes and modifications can be made without departing the scope of the present invention. For instance, a plurality of bus-type network can be provided, instead of one bus-type network as in the above embodiment in which the single bus-type network is connected to a ring-type network by one station. If a network interface and a plurality of transmission-reception processing sections are provided for each of the bus-type network, the same advantage as in the above embodiment can be achieved.

What is claimed is:

1. A network system comprising:
   a trunk network having a plurality of transmission paths;
   a branch network; and
   a station coupled to said trunk and branch networks for controlling data transmission between said trunk and branch networks, said station including:
   a plurality of internal buses, each coupled to a respective one of said plurality of transmission paths of the trunk network,
   a plurality of transmission-reception control means, each corresponding to a respective one of the plurality of transmission paths and coupled to a respective one of said plurality of internal buses for controlling data transmission between respective transmission paths of the trunk network and said branch network,
   first network interface means, coupled to said plurality of transmission paths and said plurality of internal buses, for controlling data transmission between said plurality of transmission paths and said plurality of transmission-reception control means, and
   second network interface means, coupled to said branch network and said plurality of transmission-reception control means, for controlling data transmission between said branch network and said plurality of transmission-reception control means.

2. The network system according to claim 1, wherein the trunk network includes a ring-type network.

3. The network according to claim 1, wherein the branch network includes a bus-type network.

4. The network system according to claim 1, wherein the transmission-reception control means includes:
   address storing means for storing address data representing said station and a destination station;
   receiving buffer means for storing data from the trunk network;
   means coupled to said receiving buffer means for transmitting stored data to the branch network;
   transmitting buffer means for storing data from the branch network; and
   means coupled to said transmitting buffer means and address storing means for transmitting stored data to one or more stations coupled to the trunk network in accordance with said address data.

5. A network system comprising:
   a trunk network having a plurality of transmission paths;
   a branch network;
   a plurality of internal buses, each coupled to a respective one of said plurality of transmission paths of the trunk network;
   network interface means, coupled to said internal buses and said branch network, for controlling data transmission between said transmission paths of the trunk network and said branch network; and
   a plurality of transmission-reception control means coupled to said network interface means, each control means corresponding to a respective one of said plurality of transmission paths and coupled to a respective one of said plurality of internal buses, each for controlling data transmission between said respective one transmission path of the trunk network and said branch network.

6. The network system according to claim 5, wherein the trunk network includes a ring-type network.

7. The network system according to claim 5, wherein the branch network includes a bus-type network.

8. The network system according to claim 5, wherein the transmission-reception control means includes:
   address storing means for storing address data representing said station and a destination station;
   receiving buffer means for storing data from the trunk network;
   means coupled to said receiving buffer means for transmitting stored data to the branch network;
   transmitting buffer means for storing data from the branch network; and
   means coupled to said transmitting buffer means and address storing means for transmitting stored data to one or more stations coupled to the trunk network in accordance with said address data.

9. The network system according to claim 1, wherein each transmission path of the trunk network carries a signal having a wavelength to transmit data.

10. The network system according to claim 9, wherein the wavelength of said signal of the transmission paths is different from one another.

11. The network system according to claim 1, wherein said transmission-reception control means includes means for controlling said data transmission in response to a transmission state of said network system.

12. The network system according to claim 11, wherein said transmission state includes a busy, no response or broadcast state.

13. The network system according to claim 5, wherein each transmission path of the trunk network carries a signal having a wavelength to transmit data.

14. The network system according to claim 13, wherein the wavelength of said signal of the transmission paths is different from one another.

15. The network system according to claim 5, wherein said transmission-reception control means includes means for controlling said data transmission in response to a transmission state of said network system.

16. The network system according to claim 15, wherein said transmission state includes a busy, no response or broadcast state.

* * * * *

UNITED STATES PATENT AND TRADEMARK OFFICE
CERTIFICATE OF CORRECTION

PATENT NO. : 5,117,419
DATED : May 26, 1992
INVENTOR(S) : Kuniyoshi KONISHI et al.

It is certified that error appears in the above-identified patent and that said Letters Patent is hereby corrected as shown below:

On the Title page, item [57], col. 2,
Abstract, line 5, after "processing" change "stations"
to --sections--.

Signed and Sealed this

Ninth Day of November, 1993

Attest:

BRUCE LEHMAN

Attesting Officer        Commissioner of Patents and Trademarks